United States Patent [19]
Weber et al.

[11] 3,975,714
[45] Aug. 17, 1976

[54] DATA PROCESSING SYSTEM INCLUDING AN LSI CHIP CONTAINING A MEMORY AND ITS OWN ADDRESS REGISTER

[75] Inventors: Gerald Weber; Jürgen Sorgenfrei, both of Braunschweig, Germany

[73] Assignee: Olympia Werke AG, Wilhelmshaven, Germany

[22] Filed: Dec. 20, 1974

[21] Appl. No.: 535,092

[30] Foreign Application Priority Data
Dec. 22, 1973 Germany............................ 2364254

[52] U.S. Cl. .............................................. 340/172.5
[51] Int. Cl.² ........................................ G06F 13/00
[58] Field of Search ...................... 340/172.5, 173 R

[56] References Cited
UNITED STATES PATENTS

| 3,691,538 | 9/1972 | Haney | 340/173 R |
| 3,757,306 | 9/1973 | Boone | 340/172.5 |
| 3,813,650 | 5/1974 | Hunter | 340/172.5 |
| 3,821,715 | 6/1974 | Huff, Jr. | 340/172.5 |
| 3,855,577 | 12/1974 | Vandierendonck | 340/172.5 |

OTHER PUBLICATIONS
"Intel MCS-4 Micro Computer Set", Intel Corporation, Jan. 1972.
"MOS/LSI Launches the Low Cost Processor", *IEEE Spectrum*, Gerald Lapidus, Nov. 1972, pp. 33–40.

*Primary Examiner*—Gareth D. Shaw
*Assistant Examiner*—James D. Thomas
*Attorney, Agent, or Firm*—Spencer & Kaye

[57] ABSTRACT

In a circuit arrangement composed of chips containing highly integrated MOS circuit components for a data processing device, the arrangement including a first chip containing a central arithmetic and control unit, a plurality of further chips each containing a memory, and a bus connecting the chips, each further chip is provided with its own address register for addressing the memory on that chip, and the register is capable of being set to contain any desired address word and to selectively count through a sequence of successive address words under control of counting pulses, each address word identifying a respective word location of the associated memory.

12 Claims, 7 Drawing Figures

DATA PROCESSING SYSTEM INCLUDING AN LSI CHIP CONTAINING A MEMORY AND ITS OWN ADDRESS REGISTER

BACKGROUND OF THE INVENTION

The present invention relates to highly integrated circuit arrangements formed on chips for data processing devices, and particularly arrangements fabricated according to the MOS technique, and of the type including a first chip containing a central arithmetic and control unit (RSE) and at least one further chip containing memories, with the chips being connected together by means of a bus containing, inter alia, a plurality of data lines and in which the contents of one or a plurality of memories is continuously read out under control of an address register.

Various circuit arrangements on MOS chips of the above-described type are known in the art. The memory chips which contain, inter alia, the operating program of the instrument for which the circuit arrangement is intended in the form of a series of microinstructions, are connected with the RSE via a collecting cable made up of an address bus, a data bus and a control bus. The RSE chip includes a settable address register which is switched on by counting pulses and which is able to receive an entire address of, for example, 14 bits.

Each memory location in the memory chips has an address associated therewith. Each address is conducted from the RSE via the bus to each one of the connected memory chips. There it is decoded and then one of the memory chips is selected and thereupon the appropriate memory location in the selected memory is addressed. The contents of the addressed memory location are now available for possible transfer to the RSE until the next address calls up the next-following memory location.

A special problem in the field of MOS circuitry is that the high resistance associated therewith limits the maximum operating frequency. As a result, the operational speeds are low. Thus, MOS circuit arrangements are inferior, as regards operating speed, to those designed according to the bipolar technique.

The time required for calling up a memory location by an address can, in principle, be divided into two time periods: a first time period for conducting the address from the address register of the RSE chip to the respective memory chip; and a second time period for decoding the address and addressing the memory location in the memory chip.

Additionally, as a result of the extremely small size of the chips, the number of connecting contacts on each chip is very limited. If the addresses consist of a large number of bits (for example 14 bits) a parallel transmission would require 14 address lines and thus 14 connecting contacts. Since the remaining number of connecting contacts is generally no longer sufficient to accommodate all of the other required lines, the multiple bit addresses are often subdivided. Thus fewer lines and connecting contacts are required and every address is transmitted in the form of several successive bit groups. However, this even further reduces the already low operating speed.

SUMMARY OF THE INVENTION

It is an object of the present invention to increase the processing speeds of circuit arrangements of the above-described type without increasing the number of connecting contacts over that required for parallel operation in the state of the art.

This and other objects are achieved, according to the invention, by providing each memory chip with its own address register whose contents can be continuously varied by counting pulses and can also be set by an address which is written in its entirety.

The advantages of the present invention reside, in particular, in that the normal calling, or addressing, cycle involves only the memory chips themselves and no longer takes place between the memory chips and the RSE chip. As a result the time required for conducting the address from the RSE chip to the memory chips is eliminated. Since entire sequences of memory locations are often called up by counting pulses, the time gained for each address results in a considerable increase in the operating speed.

In one advantageous embodiment of the present invention, the address register can be set to an address provided by another chip, e.g. an RSE or memory chip, and the data lines are utilized for the transmission of the address bits. This eliminates special address lines and thus connecting contacts at the chips. If the number of bits required for addressing the memory words stored on the chip is greater, however, than the number of data bits per memory word, i.e. the number of required address bits is greater than the number of data lines which are present, the missing address bits are transmitted over separate address lines.

If a transfer address contained in a transfer instruction is emitted from a memory chip, then according to a further advantageous embodiment the selected address register can be directly set via the data output of the memory chip and the setting input of the address register or registers. This eliminates the requirement for several cycles for conducting to the RSE, intermediate storage and retransporting to the address register of the memory chip.

According to a further advantageous embodiment, in which a plurality of memory chips are provided, further address lines are provided in addition to the separate address lines and these further address lines are utilized to select the address register of one or a plurality of memory chips. In this case it is possible to reset only one or some of the address registers of a plurality of chips.

DESCRIPTION OF THE PREFERRED EMBODIMENTS

Figure 1:
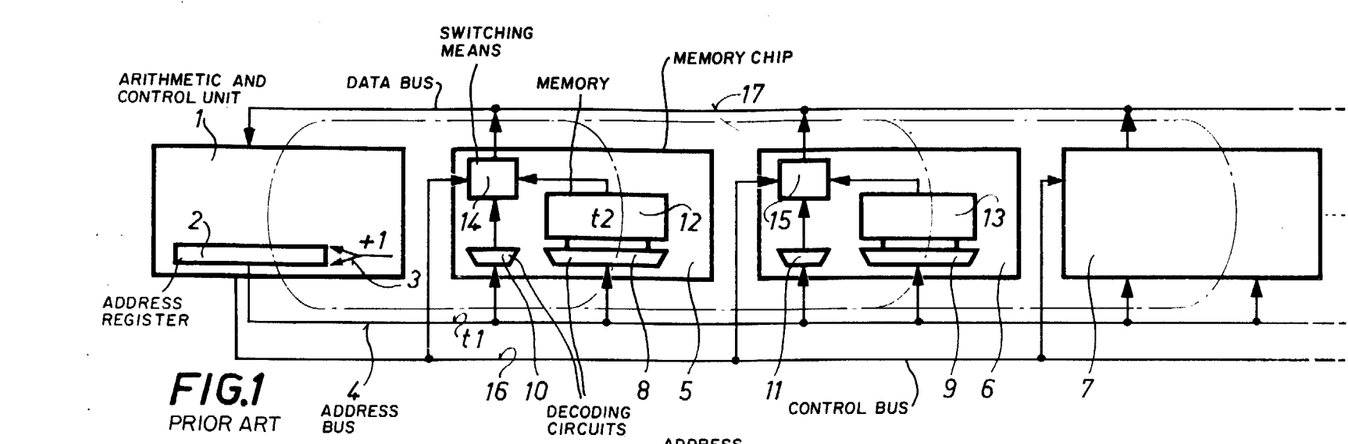
FIG. 1 is a schematic block diagram of a known circuit arrangement for a data processing device.

FIG. 1 shows a circuit arrangement which includes the function blocks which are significant for an understanding of the present invention. On a first chip 1, which includes a central arithmetic and control unit, or RSE, there is provided an address register 2 having a capacity of, for example, 14 bits. This address register 2 can be set to any desired initial state and can be switched on by counting pulses. The counting capability of the register is indicated by the double arrow 3. The purpose of executing a counting operation to change the address in register 2 is to cause all memory locations belonging to a program in any one of the ROM's (read only memories) or RAMS's (random access memories) which are part of the circuit arrangement to be called on in rapid succession. Calling is intended to mean the addressing of a memory location in such a way that a further control signal will cause, if required, the memory contents of the addressed memory location to be read out of the memory for transfer to and processing in the arithmetic and control unit 1, or will cause a data word to be transferred from RSE 1 to the memory and to be written into the addressed location.

The arithmetic and control unit (RSE) is a computer capable of processing information of a general type.

In the example of FIG. 1 the address present in address register 2 of RSE chip 1 must be conducted via the lines of an address bus 4 to the memory, or PSE, chips 5, 6 and 7 so that the respective memory location can be selected. A time interval indicated as $t1$ is required for the transfer of each address from the RSE chip 1 to one of the memory chips 5, 6 and 7. The shortest possible time period is required when all 14 bits of the address are conducted in parallel. For this purpose the address bus 4 must include 14 individual lines and at the RSE chip 1 as well as at the memory chips 5, 6 and 7, 14 of the limited number of available connecting contacts will be occupied.

If, according to a second possibility, the 14-bit address is conducted in two or more successive partial sections the duration of $t1$ increases by a corresponding amount. To simplify understanding, however, it will hereinafter be assumed that the 14 bits of the address are transmitted in parallel.

Part of the address bits, for example 10 bits, is conducted over the lines of the address bus 4 to the decoding circuits 8 and 9 of memory chips 5 and 6, respectively, and the remaining 4 bits are conducted to the decoding circuits 10 and 11. Each memory 12, 13 of the memory chips 5, 6 contains as many memory locations, each accommodating 8 bits for example, as can be distinguished by the 10 bits of the address. Consequently, the 10 bits of the transmitted address determine which memory location is being called up in each memory chip.

While $t$ indicates the time required for the external transmission to the memory chip, the internal addressing of the memory locations in each memory chip requires a further time period $t2$. The remaining 4 bits of the address which were decoded in the decoding circuits 10, 11, determine which of memory chips 5, 6 and 7 is intended. The outputs of the thus designated decoding circuit and of the associated memory then together determine that stored instruction or data word which can be read out by a control signal via switching means 14, 15, which are not shown in detail.

The control signal passes through a control bus 16 from the RSE chip 1 to the memory chips 5, 6, 7. The instructions and data which are read out are fed to the RSE chip 1 via a data bus 17 for processing. Of course it is also possible to convey date in the reverse direction, via data bus 17 to memory chips 5, 6, 7.

It can be seen that the addressing of each memory word requires a time $t1 + t2$. Since in sequential operation every memory location must be called and since it is possible with a 10-bit address to address 1,024 memory locations and with a 4-bit address to address 16 memory chips, a time of $16 \times 1,024 \times (t1 + t2)$ is required to call up all memory locations.

Figure 2:
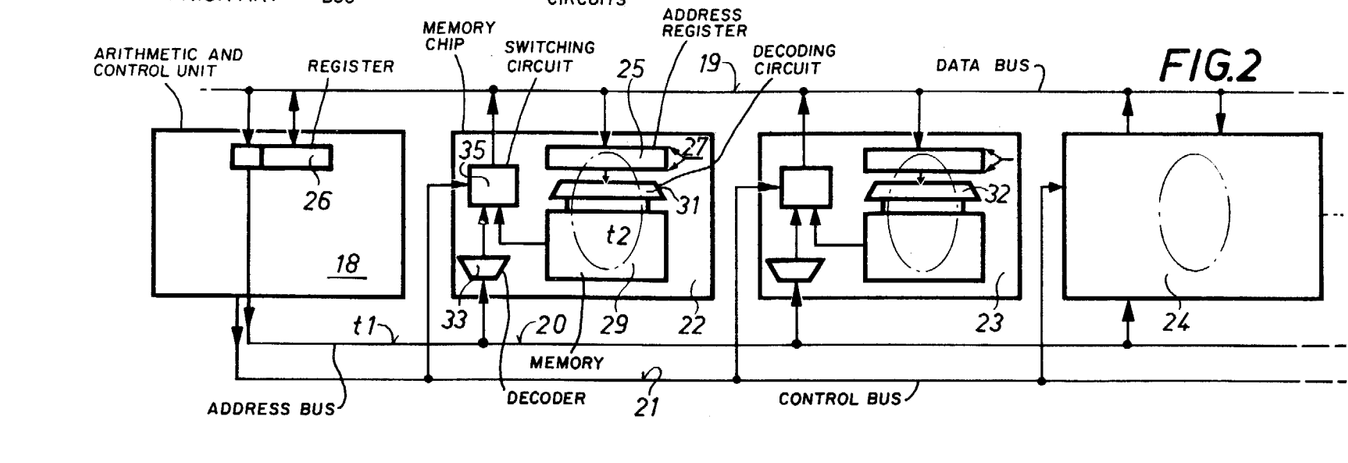
FIG. 2 is a schematic diagram of an embodiment of a device according to the present invention.

Compared to this state of the art as shown in FIG. 1, FIG. 2 shows a comparable embodiment of the present invention. The dot-dash lines in FIGS. 1 and 2 demonstrate at a glance the significant difference in the signal flow. An RSE chip 18 is again connected with memory, or PSE, chips 22, 23, 24 by means of an address bus 20 and a control bus 21. Each memory chip may again contain an ROM (read-only memory) or RAM (random access memory).

Each memory chip 22, 23, 24 includes an address register 25 which can be switched on by counting pulses and which has 10 bit locations, for example. The counting ability is again indicated by the respective double arrow 27. The memory locations in the memory 29 of each chip 22, 23, 24 are called up internally and simultaneously by the respective address register via a decoding circuit 31, 32, etc. A time period $t2$ is required for calling each memory location. The selection of one of the plurality of memory chips is effected by an address, for example a 4-bit address, coming from the RSE chip 18 through address bus 20. This address passes into a decoder 33 in each memory chip 22, 23, 24.

If a signal coming through control bus 21 causes an instruction or data word to be read out in the circuit means 35, which are shown only schematically, the contents of the memory location addressed by the address register in the interior of that one of chips 22, 23, 24 which was selected by the 4-bit address is conducted to the RSE chip 18 via data bus 19.

It can be seen that the signal flow for the internal addressing of each memory location as shown by the dot-dash line requires only a time $t2$. The time $t1$ required to select one of a plurality of chips by means of the 4-bit address concurrently with time $t2$ because the selection of the chip can take place simultaneously with the selection of a memory location in the chips. This effectively cuts the time required to enable every memory location content to the time $t2$. Compared to the circuit of FIG. 1, the full sequential calling up of the entire memory contents saves $16 \times 1,024 \times t1$.

Memories 29 generally also contain the so-called transfer instructions which are to effect the skipping of several program steps in the course of a program. This means, however, that the regular switching of the address register 25 must be interrupted so that the next address will not be called up. Thus, if, for example such a transfer instruction is given from memory 29 via data bus 19 to RSE 18 will initiate, via control bus 21, the transmission of a transfer address contained in memory 29 to the address register 25 via switching means 35 and data bus 19. Thus, in deviation from the regular switching of the content of register 25, the address in register 25 is replaced by a new address.

However, the address register 25 can also be set in a different way. If a transfer instruction is read out of memory 29 as a result of a signal coming from control bus 21 and is conducted via data bus 19 to the RSE chip 18, storage will then be effected in an intermediate register 26 in chip 18.

If the numbers of bits in the transfer address is greater than the number of data lines, RSE 18 causes part of the transfer address to be transmitted via data bus 19 to the address registers 25 of the memory chips, the other part of the transfer address travelling to the memory chips over address bus 20 and being utilized for selection. Since it is conceivable that the transfer instruction read out from the memory of the one memory chip contains a transfer address identifying an address disposed in another memory chip, this solution offers the advantage that the memory chip involved can be addressed directly from RSE 18.

The arrangement of address registers in the memory chips provided by the present invention relieves the load on the data lines during the sequential switching of the address registers so that those lines can be utilized for the transmission of the transfer address which sets the address registers. If it is assumed that every memory word consists of 8 bits, the data bus must have 8 data lines. This would mean that only $2^8 = 256$ memory locations could be addressed via the data bus and an 8-digit address register would be sufficient.

Figure 3:
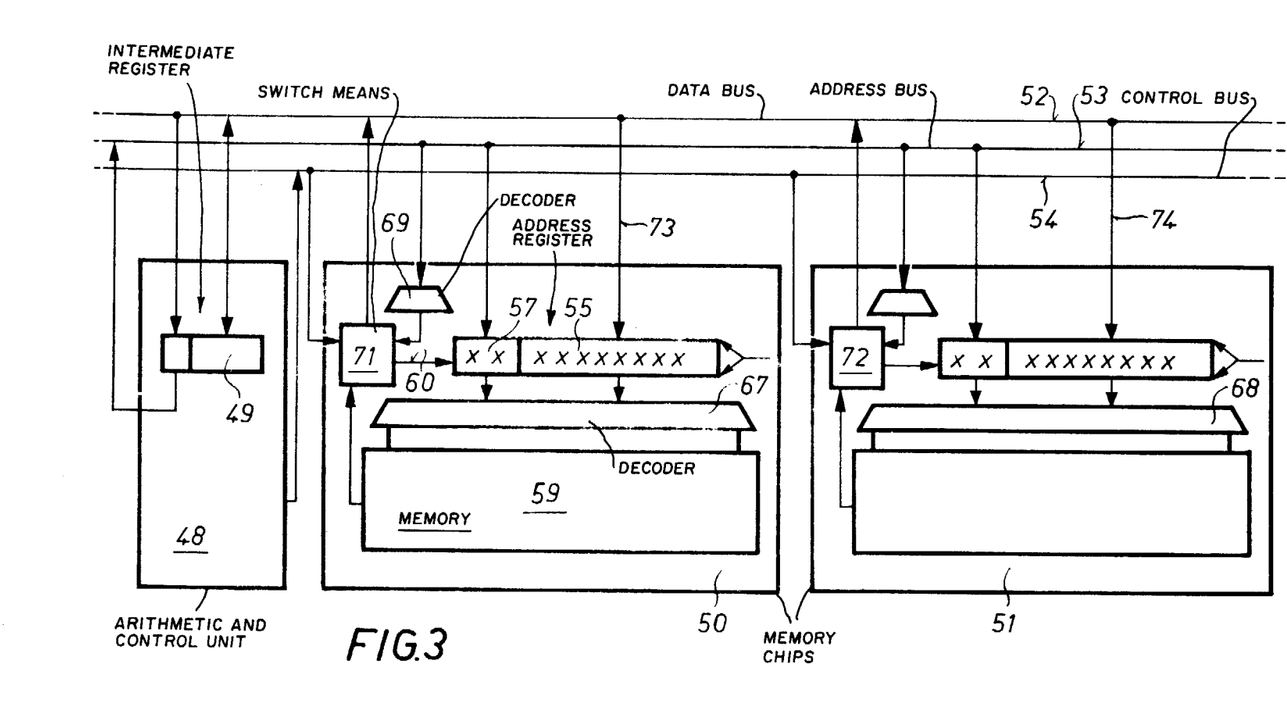
FIG. 3 is a schematic diagram of another embodiment of the present invention.

If a larger number of memory locations can be accommodated on a memory chip, a larger address register is required. FIG. 3 shows a further embodiment of the present invention which includes an arithmetic and control unit 48 and two memory chips 50, and 51 connected to a data bus 52, an address bus 53 and a control bus 54. In the present example $2^{10} = 1,024$ memory locations are accommodated in every memory chip so that 10 bits are required for the addresses.

Each memory chip includes a settable address register which can perform a counting operation and which consists of an 8-bit part 55 and a 2-bit part 57. The number of bits is indicated by crosses.

RSE 48 contains an intermediate register 49 which can store a transfer address. If a transfer order is read out of memory 59 on instruction of a signal coming through control bus 54 and is transferred, in two transmission cycles, to the RSE chip 48 through data bus 52 which consists of 8 lines, then it is stored in the intermediate register 49 in RSE chip 48. If the transfer address is too long to be accommodated by the number of data lines, then RSE 48 causes a first portion of the transfer address to be transferred via data bus 52 to the 8-bit address register portion 55 and a second part of the transfer address to be transferred via the lines of address bus 53 to the 2-bit address register portion 57, a third part of the transfer address passing through the lines of address bus 53 and decoder 69 to the switching means 71 where it is utilized for the selection, via line 60 of the entire address register 55, 57. The decoders 67 and 68 operate in the same manner as the decoder 31 of FIG. 2.

Writing of the transfer address into the intermediate register 26 of FIG. 2 or 49 of FIG. 3 can be eliminated when the addresses transmitted through the address lines for the selection of a memory region and an address register coincide, i.e. when the address register and memory region lie in the same chip. The transfer address is then written in directly from memory 29 of FIG. 2 or 59 of FIG. 3 via the switching means 35 of FIG. 2 or 71 of FIG. 3 and the data bus 19 or 52, respectively, into the address register 25 or 55, respectively.

The addressing technique used in the circuit arrangement shown in FIG. 1 is currently used in the microprocessor manufactured by the Intel Corp. of Santa Clara, Calif. and sold under the identifying designation "8080".

This technique is described in the manufacturer's publication: Preliminary Specification Rev. 3, February 1974, "Single Chip 8-bit Parallel Central Processor Unit 8080". This microprocessor is referred to in an article in the periodical *Electronics*, October 11, 1973, page 91, entitled "Designing With Microprocessors Instead of Wired Logic Asks More of Designers" by Bruce Gladstone.

A comparable addressing technique is also employed in the processing system PPS 4 manufactured by Rockwell International Microelectronic Device Div. This is described in the following publication by the firm:

MOS/LSI Parallel Processing System (PPS) "Programmers Reference Manuel for Microprogramming", April 1973, Publication No. 2520-D-26 303.

Figure 4:
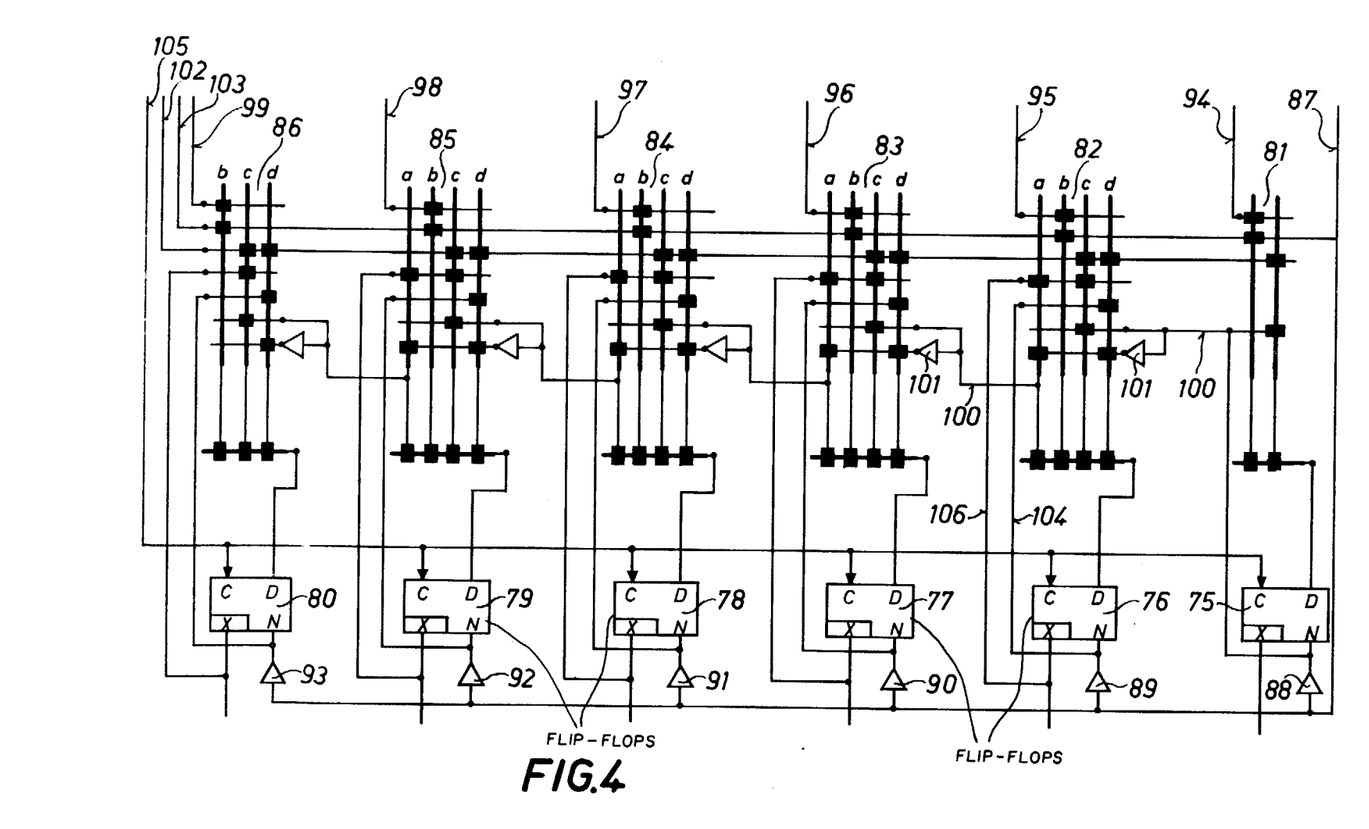
FIG. 4 is a schematic block diagram of one embodiment of a component of the device of FIG. 2.

FIG. 4 shows the first six locations of a settable and countable address register in a memory chip, e.g. in memory chip 22 of FIG. 2. Storage of the bit values identifying address locations 1 to 6 is effected in flip-flops 75 to 80, respectively. Each of these flip-flops is of a known type in which the transfer of information present at its input D is effected in synchronism with a clock pulse applied at its input C. The thus stored information is available at output X of each respective flip-flop 75 to 80. Also provided at N is an inverted output at which appears the complement of the output signal at X. Each flip-flop 75 to 80 has connected ahead of it the actual setting and counting logic in the form of a respective one of matrices 41 to 46. These are ROM matrices executing the logic function NOR-NOR. The defined output state of flip-flops 75 to 80, upon the application of the supply voltage, is controlled by a signal (e.g. of −5 volt) fed in via line 87. This signal thus imparts, via inverters 88 to 93, the potential of 0 volt to the N outputs of flip-flops 75 to 80. All of the flip-flops 75 to 80 are thus set to their "1" state.

The outputs X provide the six lowermost bits of the address. In his embodiment, these outputs carry a voltage of −5 volt after switching on which, in logic terms, corresponds to "1" states.

A jump address is transmitted in inverted form to the PSE chip from the RSE chip 1 via the data bus, i.e. the binary jump address 0 corresponds to "1" signals at the data bus, which bus is composed of lines 94 to 99. Since the flip-flops 75 to 80 also take over the inverted addresses, the logic binary address 0 corresponds to "1" states in flip-flops 75 to 80. This is identical with the output states when the system is switched on. Due to the inverted states, the logic binary address in fact addresses the highest valued address in, for example, the ROM memory in a memory chip.

The logic function of the control matrices 81 to 86 will be described in detail for matrix 82 which is associated with bit location 2 of the address.

Matrix 82 comprises two NOR stages, of which the first stage is provided with four so-called control terms $a$, $b$, $c$, $d$, and the second stage is provided with a control term $e$, and constitutes a NOR-NOR logic. Each control term *a* through *e* constitutes a NOR circuit, the black rectangles at the points of intersection between control terms and the lines perpendicular thereto representing the inputs of the lines into the respective NOR circuit.

Control term *b* controls the transfer of the bit value in location 2 of the address from the data bus line 95 into the flip-flop 76. Terms *c* and *d* constitute the counting logic for bit location 2. Term *a* is a transfer term and furnishes a negative potential to the next-higher register location 77 when the preceding register locations 75 and 76 are in their zero state. The state of flip-flop 76 is transmitted from its output X via line 106 to the control term *a*.

This transfer signal from term *a*, together with the state of flip-flop 77, forms the transfer signal for register location 78, the transfer signal for location 78 together with the position of flip-flop 78 forms the transfer signal for register location 79, etc. This serial transfer process is effected to the sixth bit location. The transfer from, for example, matrix 82 to matrix 83 is effected by the output of the control term *a* of matrix 82 via line 100 and inverter 101 of matrix 83. Such a serial transfer formation via the inverter chain from matrix to matrix is known by the term "ripple carry".

The counter and transfer control is effected by means of enabling signals applied to lines 102 and 103. A signal of 0 volt at line 103 activates the control terms *b* of the matrices and effects the switching through of the information from lines 94 to 99 of the data bus into the flip-flops 75 to 80. A control signal of 0 volt to line 102 activates the counter control terms *c* and *d* of the matrices. The counter control terms *c* and *d* receive their information from the state of the respectively associated flip-flop, e.g. in the example of matrix 82 via lines 106 and 104, and from the transfer condition, via the respective line 100 and inverter 101, formed from the preceding stages.

The matrix terms *c* and *d* constitute — when considered through all stages — an adding mechanism for adding "minus 1". The information, reduced by 1, is transferred to the register by a transfer clock pulse applied to inputs C of flip-flops 75 to 80 via line 105.

From the viewpoint of the utilization of the unit, the settable and countable address register is treated as an upward counter, whereas with respect to the form of construction discussed in connection with this embodiment, as mentioned above, it actually is a downward counter due to the inverted data transfer through the data bus.

Figure 5:
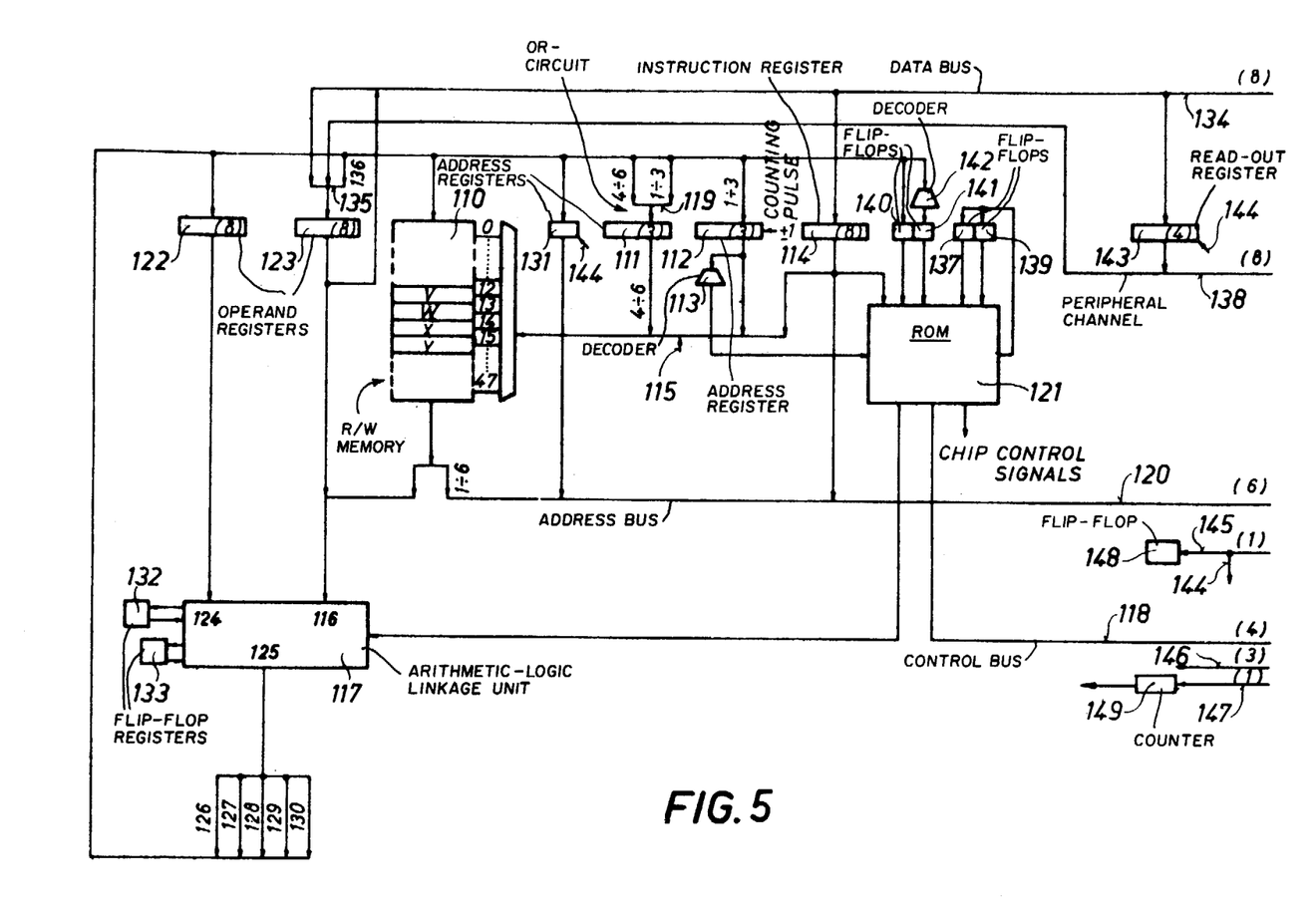
FIG. 5 is a block circuit diagram of one embodiment of the RSE unit 1 of FIG. 1, 18 of FIG. 2, or 48 of FIG. 3.
Figure 6:
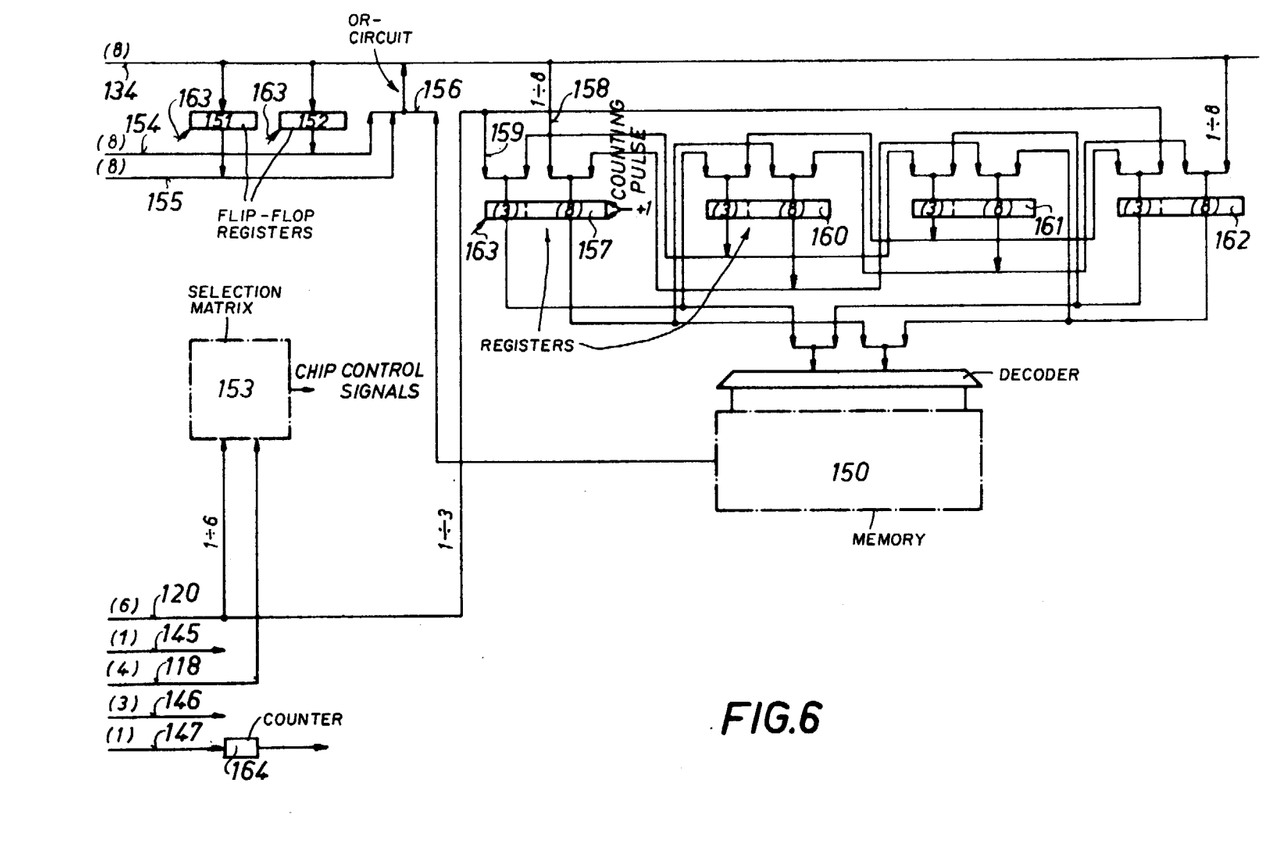
FIG. 6 is a block circuit diagram of one embodiment of one of the memory chip circuits of FIGS. 2 and 3.

Every type of data transmission in a system according to the invention is under the control of the RSE unit. For this purpose, a control bus is provided and the RSE unit transmits control instructions through its lines to the memory chips. The operation of an assembly comprising an RSE chip and a memory chip will be described with reference to a particular embodiment shown in FIGS. 5 and 6, which also illustrate the control sequence. These figures correspond to FIGS. 8 and 9 of our copending U.S. application Ser. No. 535,088, filed Dec. 20, 1974. The embodiment shown in FIGS. 5 and 6 is intended to be constituted as a modular structure; i.e. regarding the address, the groups on the chips comprise various modules, such as, for example, ROM modules, RAM modules, or peripheral modules. The embodiment of FIGS. 5 and 6 is provided with ROM modules and peripheral modules. All modules are connected together via the module bus which comprises the data bus, already described in connection with FIGS. 2 and 3, the address bus and the control bus and is additionally provided with voltage supply, clock pulse and starting state lines. Every chip on which modules are disposed is also provided with peripheral terminals which are connected to peripheral channels on the chips.

The memory chip of FIG. 6, which will be identified hereafter as the PSE unit, has an address capacity of four memory modules with 256 bytes each as well as two peripheral modules. The term "bute" means a group of bits, forming together a data word.

Compared to the register 55, 57 or FIG. 3, register 157 of the PSE unit of FIG. 6 has 11 bit locations. The eleventh location is required because it is advantageous, for the particular program employed to have eight ROM modules combined, as will be explained below in connection with the description of FIG. 6. Of course further memory chips can be connected to the RSE unit and the module bus, as shown in FIGS. 1 and 3, which comprise in addition to peripheral modules, either ROM modules, RAM modules, or a combination thereof.

FIG. 5 is a block circuit diagram of one embodiment of the arithmetic and control unit RSE of FIG. 1. The read/write memory 110 of the RSE unit in this embodiment is designed so that 48 words containing 8 bits each can be stored therein and can be either written in or read out of the cells of this read/write memory 110.

In order to address one of the maximum of 48 memory cells, a six-digit binary address is required. This binary address is furnished by address registers 111 and 112. Register 111 stores the three highest-valued address bits, while register 112 stores the three lowest-valued address bits. Registers 111 and 112 are flip-flop registers and each includes three flip-flops as indicated by the numbers in parentheses in the address registers 111 and 112 in FIG. 5. The data paths from the address registers 111 and 112 to the read/write memory 110 are identified as 4 ÷ 6 and 1 ÷ 3, respectively, corresponding to the binary value of the address of read/write memory 110. The binary contents of the address registers 111 and 112 can be changed by the running program. The address registers 111 and 112 are thus suited for the indirect addressing of the memory cells.

Address register 112 is a three-stage binary counter, respectively, and permits the sequential addressing of a data field. The organization of the read/write memory 110 may also be understood to mean that the address register 111 selects one of the maximum of six data fields while address register 112 selects one word of the maximum of eight words of the selected data field.

A decoder 113 furnishes a control signal to ROM 121 of the instruction control if it has a binary content equal to 7. This makes it possible to interrogate, with a defined jump order, the end of a data field. The bits 1 ÷ 4 of an instruction register 114 form a second address path to the read/write memory 110. By giving an explicit address in the instruction it is thus possible to address the memory cell containing addresses 0 to 15 directly over this path. In fact, however, only addresses 0 to 11 are being used. Address 12, which is assigned to memory cell V, indicates that indirect addressing of a memory cell is to be effected from address registers 111 and 112. Address 13, which is assigned to memory cell W, indicated indirect addressing and subsequent modification of the contents of the address register 112 by downward counting. Finally, address 14 which is assigned to memory cell X, indicates indirect addressing and subsequent upward counting of the contents of the address register 112. Direct addressing of memory cells, V, W, X and Y which are associated with addresses 12 to 15, is also possible. The addressing is effected implicitly, the address is decoded from the instruction code of the respective instructions, as indicated by arrow 115. After selection of a memory cell in the above-described manner, this cell is read out and reaches the operand input 116 of an arithmetic-logic linkage unit 117. The results formed in the arithmetic-logic linkage unit 117 can also be written back into the read/write memory 110 via eight lines of the data path 128 or can reach address registers 111 or 112 as new addresses.

The legend 1 ÷ 3 ahead of the address register 112 indicates that the first, second and third bits, or bits 1, 2 and 3, of output 125 of the arithmetic-logic linkage unit 117 are transferred. An OR circuit 119 is indicated in front of address register 111. Either the bits 1 ÷ 3 of output 125 of the arithmetic-logic linkage unit 117 or the bits 4 ÷ 6 are transferred to the address register 111. The memory cells X and Y of the read/write memory 110 serve to indirectly address are read-out memory, a read/write memory or the peripheral modules of further chips. for For purpose the bits 1 ÷ 6 of memory cells X or Y are connected to an address bus 120.

The arithmetic portion of the unit RSE includes the arithmetic-logic linkage unit 117 in which the actual arithmetic functions are performed and the two operand registers 122 and 123. These are eight-digit flip-flop registers, indicated by the numeral 8 in parentheses. The arithmetic-logic linkage unit 117 links two operands which are present at inputs 116 and 124. Their output 125 is connected to a shifting mechanism, here represented by five different parallel data paths 126 and 130, the path 128 forming the RSE internal result bus. Results formed in this manner can be transferred selectively either to the operand registers 122, 123 or to the read/write memory 110 or, if they are addresses, to the address registers 111, 112 or 131.

The operand input 124 of the arithmetic-logic linkage unit 117 is principally fed by the accumulator formed by the operand register 122. The feeding of operands to the operand input 116 is effected selectively from the buffer register represented by operand register 123 or from the read/write memory 110. The type of linkage to be effected between the two operands 116 and 124 is determined by the instruction presently being followed and stored in the instruction register 114. The contents of instruction register 114 is fed for this purpose to ROM 121 of the instruction control which produces therefrom the required control signals for the arithmetic-logic linkage unit 117. The two flip-flop registers 132 and 133 store the binary transfers which occur and control the correction addition in decimal operations.

The buffer register 123 serves as an intermediate store in the transmission of data between the RSE chip and an external chip with a ROM, RAM or peripheral module. Data to be transferred into the RSE unit travel through the data bus 134 and the OR circuit 135 in front of the buffer register 123 to the buffer register 123, while data to be emitted by the RSE unit travel from the buffer register 123 through the data bus 134 to the modules on external chips. The right-hand data path 136 of the OR circuit 135 feeds the buffer register 123 with all data to be emitted. The peripheral channel 138 of the RSE unit opens into the center data path of the OR circuit. Peripheral data to be fed in through this channel come to the buffer register and from there via the arithmetic-logic linkage unit 117 to the accumulator 122 of the system.

A condition flip-flop 140 is set if a linkage result contains a zero in bit 8 which is the same as a positive number in binary representation in the scale-of-two complement. A second condition flip-flop 141 is set if the linkage result equals zero. The decoder 142 required for this purpose is indicated at the input of the condition flip-flops 141.

The control mechanism addresses, via address bus lines 120, the module of external chips which is to effect an exchange of data with the RSE. The instructions required for this purpose are furnished by the instruction to be followed, which is presently in instruction register 114. ROM 121 of the instruction control decodes the binary contents of instruction register 114 for this purpose and produces therefrom all the required control signals.

There are two groups of control signals: the RSE internal control values; and the signals for controlling the functions of the memory chips, and these four control signals are fed to these chips via control bus 118. Briefly speaking, the control mechanism controls the alternating read-out and performance of the instructions. To read out an instruction, the contents of a three-bit flip-flop register 131 is switched to three address bus lines 120. This results in eight possible combinations which define the so-called module regions. In the present embodiment, one module region has the ROM capacity of 2048 instructions and physically covers two chips. The detailed procedure of selecting an instruction word in the memory chips will be described below in conjunction with the description of the PSE block circuit diagram of FIG. 6.

The active memory module transfers the selected instruction over data bus 134 into the instruction register 114 and into the buffer register 123 of the RSE unit of FIG. 5. Thus the instruction reading cycle is completed and processing of the instruction begins. The operands required for this purpose in most cases are present in the accumulator 122 and in the read/write memory 110 of the RSE unit and thus permit the instructions to be internally processed in the RSE unit. The data bus 134 remains unused in this case so that the next instruction can be read in parallel with the processing of the current instruction.

The RSE unit has a peripheral channel 138 for feeding in 8 data bits or reading out 4 data bits, respectively. In order to read out the data bits, the contents of the accumulator 122 is brought through the arithmetic-logic linkage unit 117 into the buffer register 123, before it is transferred via data bus 134 into a read-out register 143.

The peripheral channel 138 of the RSE unit has an input capacity of eight bits over the entire channel width, but the output capability is limited to bits 5–8. Only these bits can be used, for example, via amplifiers, to operate lamps or magnetic stations of peripheral instruments. The peripheral outputs are bistable and remain in the preset state until new information is transferred to the read-out register 143.

When the system is switched on the output register 143 is automatically set to zero by a "start" signal, indicated by the arrow 144. It is thus assured that when the system is switched on, connected peripheral units will not inadvertently start functioning. The flip-flop positions, or states, of the output register 143 can be interrogated at any time via the input path 138 to the buffer register 123.

The points of interconnection for the RSE unit can be seen at the right edge of FIG. 5. The numeral indications in parentheses refer to the number of contacts associated with the respective illustrated interconnection point. The system points of interconnection which are common to all chips, the so-called module bus, includes the eight contacts of the data bus 134, the six contacts of the address bus 120, the four contacts of the control bus 118, the "start" signal contact 145, the three operating voltage contacts 146 and the one system clock pulse contact 147. This brings the total number of contact terminals in the module bus to 23.

The data bus 134 is designed to be bidirectional, i.e., the transfer of data is possible to both directions. The data (bytes) are transferred serially, while the bits of a byte are transferred in parallel. The address bus 120 serves the RSE unit to select the module on other chips with which data are to be exchanged via data bus 134. The required control instruction for the selected module, i.e. the directions of transfer, selection of register and type of data to be transferred (characters, instructions, addresses) are furnished by the RSE unit via the control bus 118.

The "start" signal 144, when the system is switched on, constitutes the defined program start at the instruction address 0. The system requires a signal change from 0 to a negative voltage once the voltage supply has reached its minimum operating values. The signal change sets a synchronization flip-flop 148 and starts the program sequence. The "start" signal 144 also erases the RSE address register 131 as well as the address registers of all memory chips. With this measure the start of the program is assured at the instruction address 0.

In order to provide a time sequence control, the chips require the system clock pulse. The system clock pulse acts in every chip on a two-stage binary counter 149 from which four counting states can be decoded. The four counting states form the so-called machine cycle. The performance of an instruction requires one or up to a maximum of four machine cycles.

FIG. 6 is a block circuit diagram of one embodiment of the memory chips of FIGS. 2 and 3. Such a PSE chip includes a program read-out memory 150, which in the present example is assumed to have a capacity of 1024 bytes of 8 bits each. The read-out memory 150 serves to store microinstructions, macroinstructions and unvarying date (e.g., numbers, text symbols, addresses, code tables). This read-out memory 150 is divided, regarding its addresses, into four modules with 256 bytes each.

The PSE unit also includes two peripheral modules 151 and 152, constituted by flip-flop registers. The user assigns a six-digit binary address between 0 and 63 to each one of the six modules contained in units 150, 151 and 152. The selection is effected in a selection matrix 153 which is stored together with the actual user program by mask programming. The RSE unit selects a module by transmitting the six-digit module address over address bus 120. In the selection matrix 153 of the PSE unit this address is compared with the module address provided by the user and upon coincidence of addresses the corresponding module is activated. The signals which are also transmitted from the RSE unit over the control bus 118 inform the activated module which functions are to be performed. They also effect the generation of the corresponding chip control values. The two peripheral modules or peripheral channels 151, 152 can be seen in the upper left of the block circuit diagram. Flip-flop register 151 corresponds to peripheral channel 1 and flip-flop register 152 corresponds to peripheral channel 2 of the PSE unit.

If peripheral data are to be emitted, the RSE unit transfers these data through data bus 134 into the active discharge register 151 or 152, respectively. These data are now present at the peripheral terminals 154 and 155 until the contents of discharge register 151 or 152, respectively, has been changed by the transmission of new information. In order to peripherally put in data the information present at the peripheral contacts 154, 155 is fed through OR circuit 156 (to the right of register 152) to data bus 134 and through it to the RSE unit.

The memory cells of the read-out memory 150 are addressed according to the following addressing scheme. There exists the possibility of addressing up to 64 memory modules through the six lines of the address bus 120. The selection of the bytes in a memory module is effected by an eleven-digit address register 157 associated with the memory module. Bits 1–8 address the bytes within one memory module. The module itself is selected by bits 9 and 10. Thus the selection of the proper instruction has been effected within a PSE chip. Regarding programming techniques it is advantageous, however, to define the page sizes of 2048 bytes. This corresponds to the capacity of two physical PSE chips. Within these pages it is possible to have a linear program sequence and with an 11-bit jump address every byte can be addressed.

The selection of which one of the two PSE chips becomes active is made by bit 11 of address register 157. The eight memory modules on two PSE chips belonging to a program page form a so-called 2k memory module region (2048 bytes). The selection of one of a plurality of regions is effected by the RSE unit via the address bus 120, lines 4 to 6.

There now follows a description of the PSE functions during the performance of a jump instruction, i.e. branching to any desired instruction address within a module region. The performance of a linear program is effected by sequential addressing of the individual instructions. For this purpose the address contents of the register 157 is continuously increased by 1. The address register 157 performs the function of an eleven-digit upward counter. If a byte with such an address contains a jump instruction, the linear program sequence is interrupted and the jump address contained in the instruction is transferred to address register 157. A jump instruction includes two bytes, which are stored in read-out memory 150 in ascending order.

The performance of an instruction requires three machine cycles. In the first cycle the first half of the instruction is transferred through OR circuit 156 and data bus 134 to the instruction register 114 of the RSE unit. This first half of the instruction contains in it bits 1–3 the upper three bits of the jump address. In the second machine cycle the second half of the instruction of the jump instruction is transferred to buffer register 123 of the RSE unit in the same manner. During the third machine cycle, bits 1–8 of the jump address are transferred from buffer register 123 via data bus 134 to the lower eight digits of register 157 of the PSE unit. In parallel therewith the three highest-valued bits are transferred from instruction register 114 of the RSE unit via the address bus 120, lines 1 to 3. Two PSE chips, belonging to one 2k module region, store this address in their address registers 157. The selection of one from a plurality of module regions, i.e. one of a plurality of pages of 2048 bytes, is effected via address bus 120, lines 4 to 6. In the block circuit diagram of the PSE unit the data paths 158 for the lower bits 1 ÷ 8 and the data paths 159 for the upper bits 9 ÷ 11 are shown separately. The number of bits (corresponding to the number of lines) is given in parentheses. The number (8) in address register 157 represents the eight bits of the address for selection of a byte in the selected memory module. The parenthetical indication (3) in the address register 157 represents the binary addresses 9–11 for selecting a memory module of a module region.

Registers 160, 161 and 162 are also eleven-digit flip-flop registers and together with register 157 form the so-called address stack, or return address register. The address stack serves to receive the return addresses in the case of subprogram jumps. It stores, in addition to the instruction address for the running program, up to 3 return addresses for a maximum of three subprogram levels. If the running program (which is addressed by register 157) is a subprogram, register 160 receives the interruption address of the higher-level program increased by 1. If the interrupted program was also a subprogram, register 161 receives the interruption address of the next-higher program level etc. That means, when a jump address is transferred into register 157, its contents, which has been increased by one, is transferred to register 160, the contents of register 160 moves to register 161 and the contents of register 161 moves to register 162. The corresponding data paths can be found in the block circuit diagram.

Upon completion of the subprogram, return to the interrupted, higher-level program is effected by a shift in the stack in the opposite direction. The contents of register 162 is transferred to register 161, the contents of register 161 to register 160 and the contents of register 160 to register 157. With the aid of this address stack a maximum of three subprogram levels are possible in addition to the main program level.

A second addressing path exists for program read-out memory 150 via address register 162. It is shown on the right side of block circuit diagram of FIG. 6. Register 162 can be loaded directly from data bus 134, and via lines 1 ÷ 3 of address 120, with an 11-digit address. Register 162 is used to address constant data which may be disposed in the same program read-out memory 150 as the controlling programs which is addressed by register 157. The reading out of unvarying data is effected over the same path as the reading out of instructions.

The points of interconnection of the PSE unit can be seen at the left margin of FIG. 6. The numerical indications in parentheses relate also to the number of contacts of the respective partial points of interconnection. Thus there are — as for the RSE unit — 8 contacts for the data bus 134, 6 contacts for the address bus 120, 4 contacts for the control bus 118, one contact for the "start" signal 144, three contacts for the operating voltages 146 and one contact for the system clock pulse 147. In the PSE unit, the "start" signal 144 sets the address register 157 as well as the discharge registers 151, 152 to address 0 at the start of the program, which is indicated by the arrows 163. In this PSE unit the system clock pulse 147 also acts on a two-stage binary counter 164 from which can be decoded four counting states which form the machine cycle.

The above shows that any type of data transmission can take place in the system under the control of the RSE unit and that the instructions to the connected modules are transmitted via the four control lines of the control bus. The module address transmitted by the RSE unit selects a module which decodes from the applied control instructions all internal control parameters, such as counting and transfer pulses. The control bus carries, in its four control lines, the control signals which will be identified as I ÷ IV hereafter. The function of the control signals will be described below with the aid of the following Table.

| Control Signal | | | | Functions Performed Upon Addressing Of: | | |
|---|---|---|---|---|---|---|
| I | II | III | IV | ROM | RAM | Peripheral Channel |
| 0 | 0 | 0 | 0 | Address instruction | Read out data | Writing in |
| 0 | 0 | 0 | 1 | | | |
| 0 | 0 | 1 | 0 | Read out address register 162 | | |
| 0 | 0 | 1 | 1 | | | |
| 0 | 1 | 0 | 0 | No operation Jump back to subprogram | No operation | No operation |
| 0 | 1 | 0 | 1 | | | |
| 0 | 1 | 1 | 0 | No operation | | |
| 0 | 1 | 1 | 1 | | | |
| 1 | 0 | 0 | 0 | No operation | Write in data | Reading out |
| 1 | 0 | 0 | 1 | | | |
| 1 | 0 | 1 | 0 | | | |
| 1 | 0 | 1 | 1 | | | |
| 1 | 1 | 0 | 0 | Address → address register 157 | Address → address register | No operation |
| 1 | 1 | 0 | 1 | Address → address register 157 and jump to subprogram | | |
| 1 | 1 | 1 | 0 | Address → address register 162 | | |
| 1 | 1 | 1 | 1 | | | |

Control signal I in the first control line controls the signal transmission direction. A logic 0 means input into the RSE unit, a logic 1 means output from the RSE unit. Control signal II in the second control line identifies the nature of the signal, or data, transmitted through the data bus. If the signal is a logic 1, the transmitted data relate to an address. In all other cases this signal is a logic 0. In the case of ROM modules, control signal III in the third control line selects one of the two address registers 157 or 162, respectively, of FIG. 6. A logic 0 means reference to register 157, a logic 1 reference to register 162. Control signal IV also influences only ROM modules. If this control signal contains a logic 1, a shift is effected in the address stack in the addressed ROM module region.

The combination of the various control signals in the four control lines effects the functions compiled in the above table. In the first column, on the left, the possible control signal combinations are listed; in the second column is listed the functions which are performed if an ROM module is addressed. The third column sets forth the functions performed when an RAM module is addressed, and the fourth column shows the functions performed when a peripheral channel is addressed.

The control signals are supplied to the lines of the control bus at the beginning of a machine cycle and remain unchanged during the cycle. The transfer of a transmitted information or the shifting within the address stack or counting of a countable address register takes place each time at the beginning of the next machine cycle.

Figure 7:
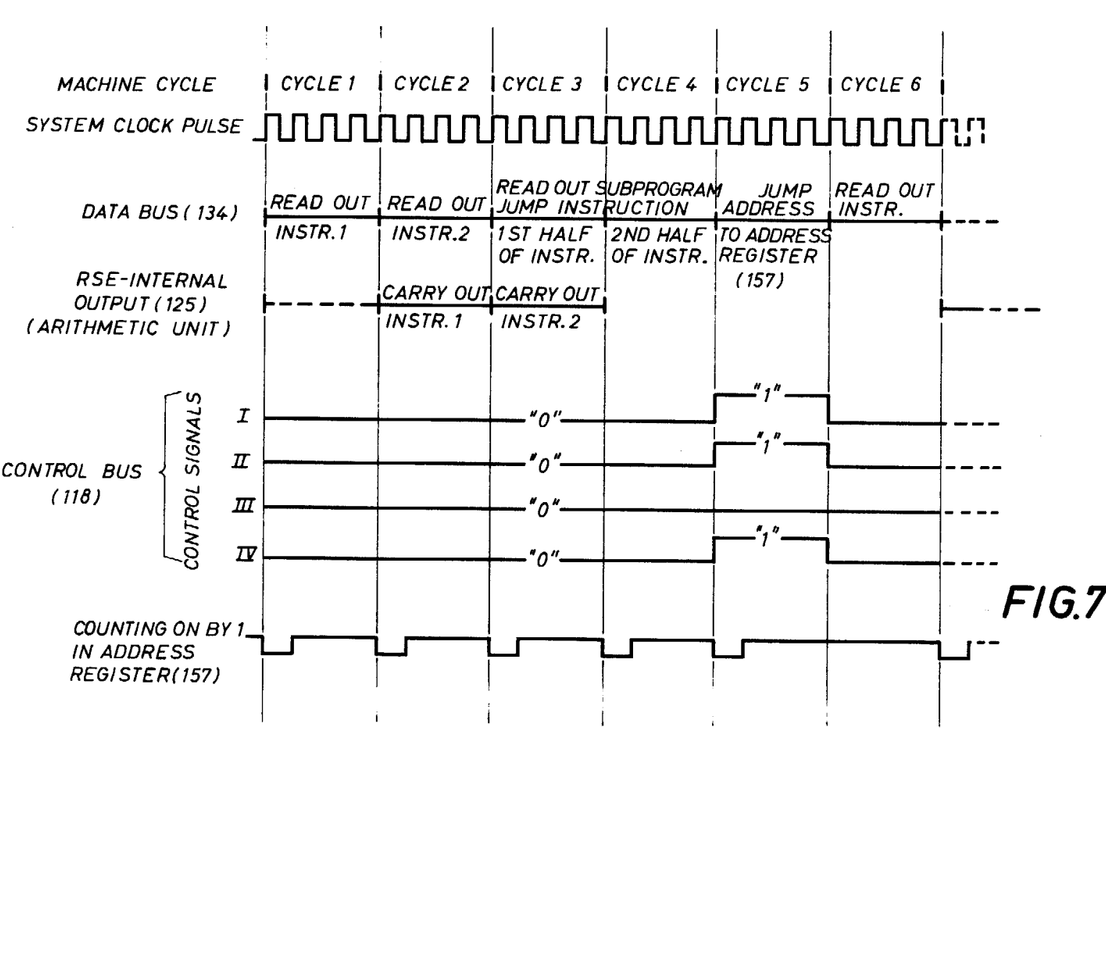
FIG. 7 is a signal diagram used in explaining the operation of systems according to the invention.

FIG. 7 shows the time sequential control in a system provided, for example, with the RSE unit of FIG. 5 and the PSE unit of FIG. 6. The uppermost line shows the system clock pulse train which in the present example is assumed to be at a rate of 800 kHz. The machine cycle is assumed to have a duration of 5 $\mu s$ so that a cycle consists of four oscillations of the system clock pulse. In the second line from the top of FIG. 7, relating to the data bus, there are designated various consecutive functions, which correspond to the consecutive machine cycles, each function lasting one cycle. Thus, instructions are read out during cycles 1 and 2, the first and second instruction halves of a longer subprogram jump instruction are read out during cycles 3 and 4 and the jump instruction is carried out during the fifth cycle, i.e. the jump address is transferred to register 157 of FIG. 6, the previous contents of register 157 is transferred to register 160, the contents of register 160 is transferred to register 161 and the contents of register 161 is transferred to register 162. During cycle 6 the instruction addressed by the jump address is read out.

In the third line from the top of FIG. 7, the output from arithmetic unit 125 of FIG. 5 is shown. During the first cycle a previously read-out instruction is carried out, while during the second machine cycle, instruction 1 is carried out and during the third machine cycle instruction 2 is carried out. Thereafter no further instruction is to be carried out in the arithmetic unit of the function diagram of FIG. 7.

The next four lines of the diagram represent the control signals in the four lines of the control bus. According to the scheme of the above Table, all four control lines carry the logic signal "0" until the end of the fourth machine cycle and this signal controls an instruction read-out in the ROM module. During the fifth machine cycle, each of the control signals I, II and IV presents a logic 1 while signal III presents a logic 0.

According to the scheme of the Table, the address is written into register 157 and a subprogram jump is carried out. The lowermost line of FIG. 7 shows the counting pulses of register 157. It can be seen that during the linear sequence the address register 157 is counted on by 1 while the continuous counting is interrupted by a jump instruction.

It will be understood that the above description of the present invention is susceptible to various modifications, changes and adaptations, and the same are intended to be comprehended within the meaning and range of equivalents of the appended claims.

We claim:

1. In a circuit arrangement composed of chips containing highly integrated circuit components for a data processing device which arrangement includes a first chip containing a central arithmetic and control unit for controlling the operation of said arrangement, at least one further chip containing a memory, and a bus connecting the chips together and including a plurality of data lines connected for selectively transferring the content of an addressed location of the memory to the arithmetic and control unit and transferring signals representing the address of a selected location of the memory to the further chip, the improvement wherein said further chip contains its own address register and means for sequentially varying the contents of its said register by counting pulses, said address register being connected to said bus to permit an entire selected address to be selectively written therein.

2. Circuit arrangement as defined in claim 1 wherein said circuit componnents are MOS components.

3. Circuit arrangement as defined in claim 2 wherein said bus is connected to said first chip to permit such an entire selected address to be written in to said own address register on said further chip by bit signals conducted from said central unit via said data lines.

4. Circuit arrangement as defined in claim 3 wherein said central unit is arranged to provide addresses having a number of bits exceeding the number of data lines and said bus further includes a plurality of separate address lines connected for conducting the address bit signals relating to the number of bits which exceed the number of data lines.

5. Circuit arrangement as defined in claim 4 wherein there are a plurality of further chips each containing a memory and said bus further includes further address lines connected for conducting address signals for selecting the memory of a respective one of said further chips.

6. Circuit arrangement as defined in claim 4 wherein there are a plurality of said further chips each containing a memory and its own address register, and said bus further includes further address lines connected for conducting address signals for selecting said own address register of at least one of said further chips.

7. Circuit arrangement as defined in claim 4 wherein said central unit contains an intermediate register and said data lines connect said own address register and said intermediate register for conducting a transfer address to said own address register via said intermediate register.

8. Circuit arrangement as defined in claim 3 wherein said memory contains at least one transfer instruction containing a transfer address in a predetermined word location and read-out of such instruction causes the address contained therein to be set into said own address register.

9. Circit arrangement as defined in claim 3 wherein said central unit contains an intermediate register and said data line connect said own address register and said intermediate register for conducting a transfer address to said own address register via said intermediate register.

10. Circuit arrangement as defined in claim 2 wherein: there are a plurality of further chips each containing a memory and its own address register; said bus is connected between said further chips; and further comprising signal transmitting means connected to be controlled by said central unit for causing the content of a selected location of said memory of one of said further chips to be written in, as a selected address, to said own register of any selected one of said further chips.

11. Circuit arrangement as defined in claim 10 for carrying out processes in which certain addresses contain a number of bits greater than the number of date lines, wherein said bus further includes a plurality of separate address lines connected for conducting the address bit signals relating to the number of bits in excess of the number of data lines from said central unit to said selected one of said further chips.

12. Circuit arrangement as defined in claim 11 wherein said central unit contains an intermediate register and said data lines connect said own address register and said intermediate register for conducting a transfer address to said own address register via said intermediate register.

* * * * *